US008482692B2

(12) United States Patent
Chang et al.

(10) Patent No.: US 8,482,692 B2
(45) Date of Patent: Jul. 9, 2013

(54) LCD APPARATUS WITH EDGE-ENGAGING ASSEMBLY AND METHOD OF FABRICATING SUCH EDGE-ENGAGING ASSEMBLY

(75) Inventors: Chih-Li Chang, Tainan (TW); Po-Chun Chen, Ruifang Town (TW); Ke-Chin Chang, Wugu Industrial Zone (TW)

(73) Assignee: Hannstar Display Corporation, Taipei County (TW)

( * ) Notice: Subject to any disclaimer, the term of this patent is extended or adjusted under 35 U.S.C. 154(b) by 410 days.

(21) Appl. No.: 12/687,463

(22) Filed: Jan. 14, 2010

(65) Prior Publication Data

US 2010/0177260 A1   Jul. 15, 2010

(30) Foreign Application Priority Data

Jan. 15, 2009   (TW) .............................. 98101429 A (51) Int. Cl.
*G02F 1/1333*   (2006.01)
(52) U.S. Cl.
USPC ...................................... 349/58; 361/679.21
(58) Field of Classification Search
USPC ...................................... 349/58; 361/679.21
See application file for complete search history.

(56) References Cited

U.S. PATENT DOCUMENTS

| 2001/0003471 | A1* | 6/2001 | Lee et al. | 349/58 |
|---|---|---|---|---|
| 2003/0218700 | A1* | 11/2003 | Tsukamoto | 349/58 |
| 2005/0146650 | A1* | 7/2005 | Chung et al. | 349/58 |
| 2008/0100768 | A1* | 5/2008 | Yang et al. | 349/58 |
| 2008/0273137 | A1* | 11/2008 | Jung et al. | 349/58 |

FOREIGN PATENT DOCUMENTS

CN            2671078 Y        1/2005

OTHER PUBLICATIONS

Chinese Office Action dated Mar. 2, 2011 for 200910126552.6, which is a corresponding Chinese application, that cites CN2671078Y.

* cited by examiner

*Primary Examiner* — Michael Caley
(74) *Attorney, Agent, or Firm* — WPAT, P.C.; Anthony King (57) ABSTRACT

The invention provides an LCD apparatus including a backlight assembly, an LCD panel assembly and an edge-engaging assembly. In particular, the edge-engaging assembly comprises N edge-engaging members, wherein N is an integer ranging from 1 to 4. Each of the N edge-engaging members has a respective inner wall adapted to engage the corresponding edge portions of the backlight assembly and the LCD assembly.

4 Claims, 14 Drawing Sheets

FIG. 9B form an LCD APPARATUS WITH EDGE-ENGAGING ASSEMBLY AND METHOD OF FABRICATING SUCH EDGE-ENGAGING ASSEMBLY

BACKGROUND OF THE INVENTION

1. Field of the Invention

The present invention relates to a liquid crystal display (LCD) apparatus comprising an edge-engaging assembly and a method of fabricating such edge-engaging assembly.

2. Description of the Prior Art

Generally speaking, an LCD apparatus can be used as a monitor of a notebook, a desk computer, a mobile communication apparatus, etc., or as a main body of a television or a digital photo frame. It usually comprises a backlight assembly and an LCD panel assembly. A traditional backlight assembly usually comprises a plurality of optical plates, a light guide plate and a reflecting plate. A traditional LCD panel assembly comprises two pieces of glass substrates and liquid crystal material which is injected between said glass substrates. In the process of assembling the LCD apparatus, an engaging member is needed to engage the edge of the backlight assembly and the LCD panel assembly, so as to stack and fix the backlight assembly and the LCD panel assembly together.

Figure 1:
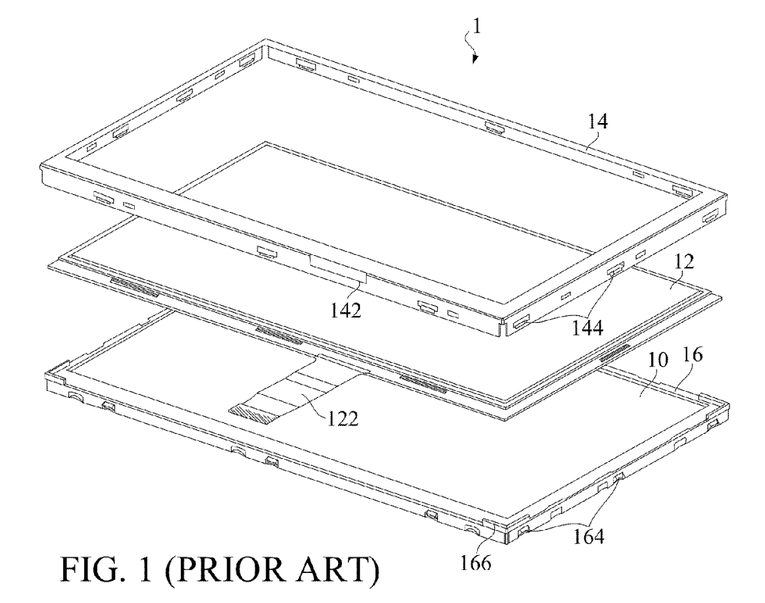
FIG. 1 is a decomposition diagram illustrating a traditional LCD apparatus 1 according to the prior art.

Please refer to FIG. 1, which illustrates a traditional LCD apparatus 1. The LCD apparatus 1 comprises a backlight assembly 10, an LCD panel assembly 12, a bezel 14 and a back cover 16.

As shown in FIG. 1, the back cover 16 has a bearing space to accommodate and fix the backlight assembly 10. The four corners of the back cover 16 have positioning bumps 166 which extend upward for positioning and settling the LCD panel assembly 12.

In order to fix the LCD panel assembly 12 with the backlight assembly 10, the bezel 14 is adapted to settle on the edge of the back cover 16. The edge of the bezel 14 has an engaging structure 144. The edge of the back cover 16 has an engaging structure 164 which can be engaged with the engaging structure 144 of the bezel 14. The LCD panel assembly 12 can be fixed to the backlight assembly 10 via the engagement of the bezel 14 and the back cover 16.

As shown in FIG. 1, the LCD panel assembly 12 has an external connecting circuit 122 for connecting a controlling/processing circuit (not shown in FIG. 1) of the LCD apparatus 1. Correspondingly, the bezel 14 has an opening 142 for the connecting circuit 122 to pass through the opening 142 and appears externally in the assembly process.

Both the bezel 14 and the back cover 16 can be generally made of a metal sheet by punching process. Moreover, the back cover 16 can also be made of a polymeric material by injection molding.

Figure 2:
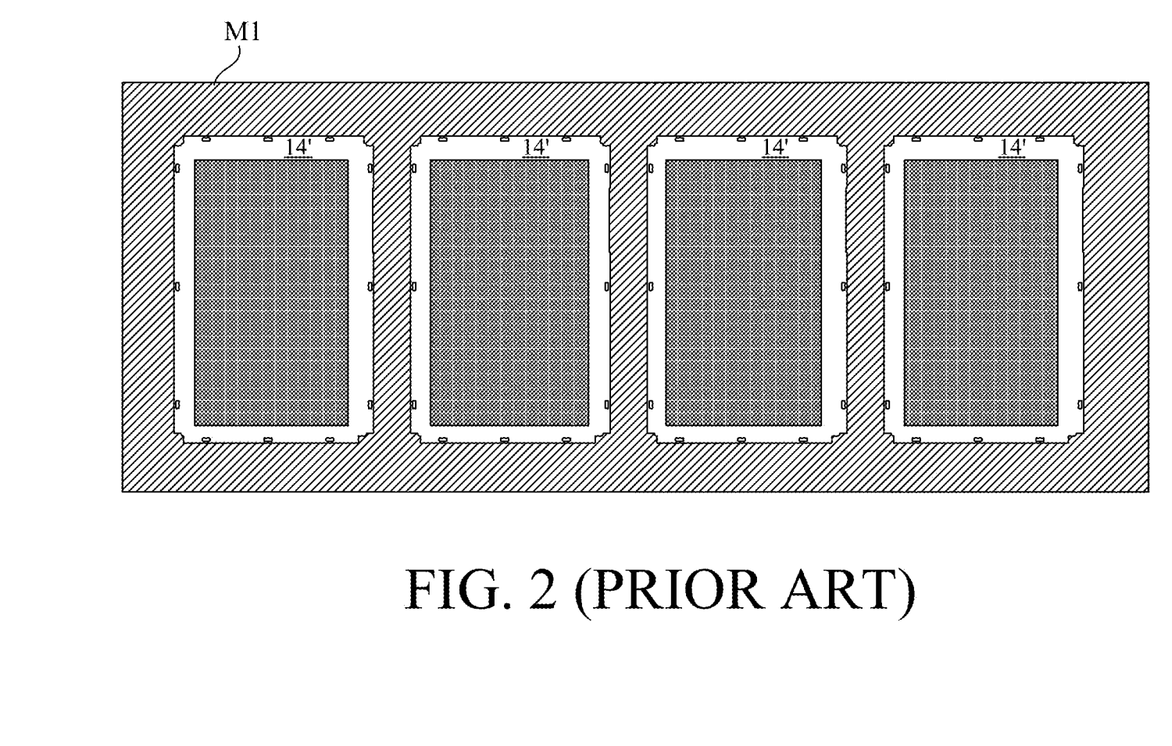
FIG. 2 is a schematic diagram illustrating several semi-finished bezels 14' by continuously punching molding modeled on a metal sheet M1.

FIG. 2 is a schematic diagram illustrating several semi-finished bezels 14' by continuously punching molding modeled on a metal sheet M1. As shown in FIG. 2, each of the semi-finished bezels 14' has a low area ratio on the metal sheet M1 and must be a closed frame. Therefore, the numbers of the semi-finished bezels 14' which can be fabricated of the metal sheet M1 is not too many. The oblique-line area marked on the metal sheet M1 is the consumables.

Figure 3:
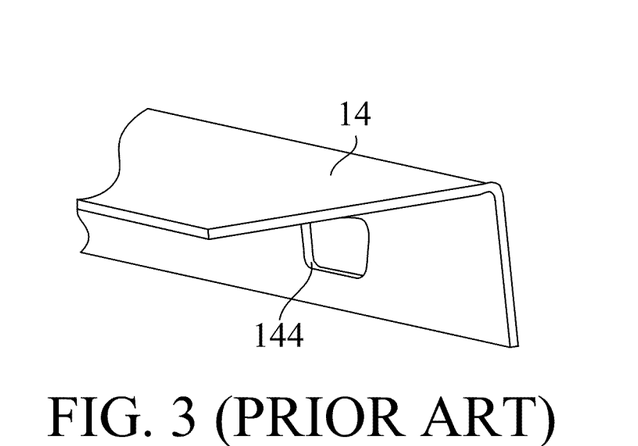
FIG. 3 is a partial view and its cross-section illustrating the bezel 14 of FIG. 1.

Please refer to FIG. 3. FIG. 3 is a partial view of the bezel 14 and its cross-section. As shown in FIG. 3, the bezel 14 has an L shape cross-section structure with weaker stiffness.

Obviously, the engaging member which engages and fixes the backlight assembly and the LCD panel assembly of the LCD apparatus in the prior art should be further improved.

SUMMARY OF THE INVENTION

Accordingly, an aspect of the present invention is to provide an LCD apparatus comprising an edge-engaging assembly and a method of fabricating the edge-engaging assembly. Particularly, the consumables reduce substantially according to the edge-engaging assembly of the invention in its fabricating process compared to the prior art. And more particularly, the edge-engaging assembly not only meets the demand of the prior art for the engaging member, but also has higher stiffness according to the invention.

According to a preferred embodiment of the invention, the LCD apparatus comprises a backlight assembly, an LCD panel assembly and an edge-engaging assembly. The backlight assembly has four first edge portions. The LCD panel assembly has four second edge portions, each of which corresponds to one of the first edge portions. The LCD panel assembly is disposed on the backlight assembly such that each of the second edge portions of the LCD panel assembly is substantially aligned with the corresponding first edge portion of the backlight assembly. The edge-engaging assembly comprises N edge-engaging members which each corresponds to at least one of the first edge portions, wherein N is an integer ranging from 1 to 4. Each of the N edge-engaging members has a respective groove adapted to receive and engage the at least one corresponding first edge portion and the second edge portions corresponding to said at least one first edge portion, whereby the LCD panel assembly and the backlight assembly are assembled.

According to a preferred embodiment of the invention, the fabricating method is to fabricate an edge-engaging assembly applied for an LCD apparatus. The edge-engaging assembly comprises N edge-engaging members, wherein N is an integer ranging from 1 to 4. The LCD apparatus comprises a backlight assembly and an LCD panel assembly. The backlight assembly has four first edge portions. The LCD panel assembly has four second edge portions, and each of the second edge portions corresponds to one of the first edge portions. The fabricating method comprises the following steps: Firstly, N molded thin strips are prepared. Next, the N molded thin strips are punched to form the N edge-engaging members, wherein each of the N edge-engaging members corresponds to at least one of the first edge portions. In the assembly process of the LCD panel assembly and the backlight assembly, the LCD panel is disposed on the backlight assembly such that each of the second edge portions of the LCD panel assembly is substantially aligned with the corresponding first edge portion of the backlight assembly, and each of the N edge-engaging member engages the at least one corresponding first edge portion and the second edge portions corresponding to said at least one first edge portion.

The objective of the present invention will no doubt become obvious to those of ordinary skill in the art after reading the following detailed description of the preferred embodiment, which is illustrated in the following figures and drawings.

DETAILED DESCRIPTION OF THE INVENTION

The invention provides a liquid crystal display (LCD) apparatus comprising an edge-engaging assembly and a method of fabricating the edge-engaging assembly. Compared to the prior art, the edge-engaging assembly according to the invention not only meets the demand of the prior art for the engaging member, but also reduces consumables largely in its fabricating process, so as to reduce the fabricating cost. In the following detailed description of the preferred embodiment, the features, spirits and advantages of the invention will be hopefully well described.

Figure 4A:
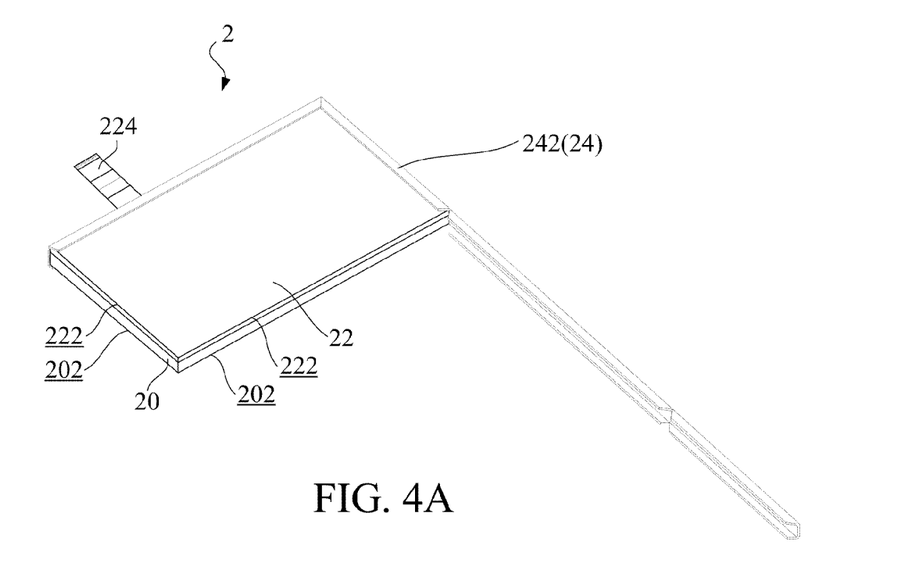
FIG. 4A is an outside view illustrating an LCD apparatus 2 in its assembly process according to a preferred embodiment of the invention.
Figure 4B:
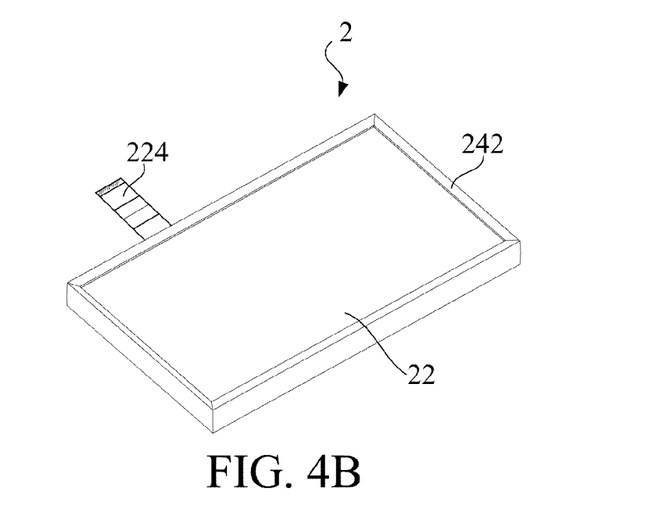
FIG. 4B is an outside view illustrating the LCD apparatus 2 of FIG. 4A after finishing its assembly process.

Please refer to FIG. 4A and FIG. 4B which illustrate a preferred embodiment of the invention in detail. FIG. 4A is an outside view illustrating an LCD apparatus 2 in its assembly process according to a preferred embodiment of the invention. FIG. 4B is an outside view illustrating the LCD apparatus 2 of FIG. 4A after finishing its assembly process. FIG. 4A and FIG. 4B also illustrate a connecting circuit 224 of the LCD panel assembly 22.

As shown in FIG. 4A, the LCD apparatus 2 comprises a backlight assembly 20, an LCD panel assembly 22 and an edge-engaging assembly 24.

Similarly, as shown in FIG. 4A, the backlight assembly 20 has four first edge portions 202. The LCD panel assembly 22 has four second edge portions 222, each of which corresponds to one of the first edge portions 202. In the assembly process, the LCD panel assembly 22 is disposed on the backlight assembly 20, such that each of the second edge portions 222 of the LCD panel assembly 22 is substantially aligned with the corresponding first edge portion 202 of the backlight assembly 20.

As shown in FIG. 4A, the edge-engaging assembly 24 comprises N edge-engaging members 242, each of which corresponds to at least one of the first edge portions 202, wherein N is an integer ranging from 1 to 4.

Figure 4C:
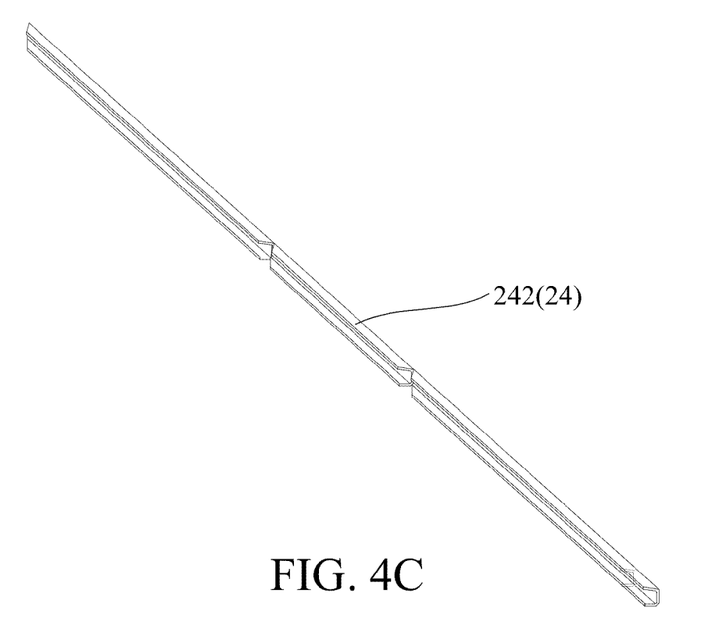
FIG. 4C to FIG. 4G are schematic diagrams respectively illustrating edge-engaging assemblies 24 according to different embodiments of the invention.

When N is equal to 1, namely, the edge-engaging member 242 is formed of a molded metal thin strip which corresponds to three or four of the first edge portions 202. As an embodiment shown in FIG. 4A, the edge-engaging member 242 corresponds to four first edge portions 202. As another embodiment shown in FIG. 4C, the edge-engaging member 242 corresponds to three first edge portions 202.

Figure 4D:
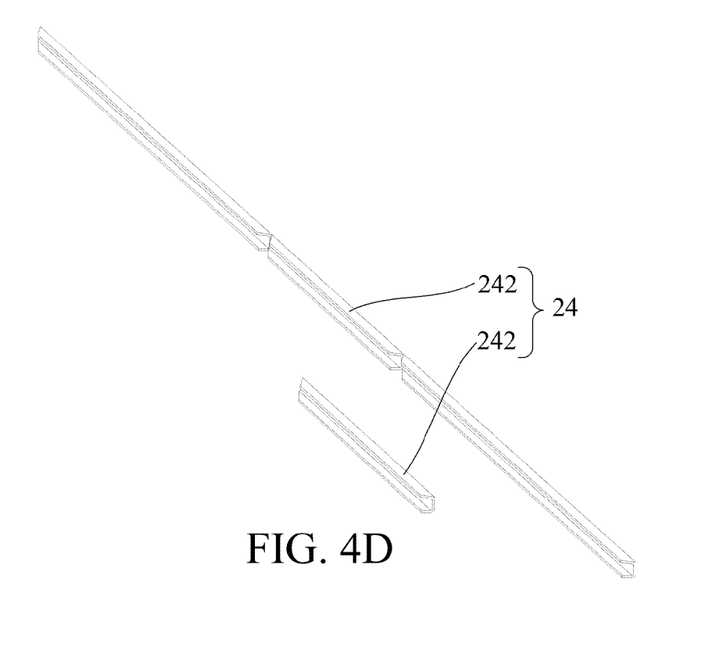
Figure 4E:
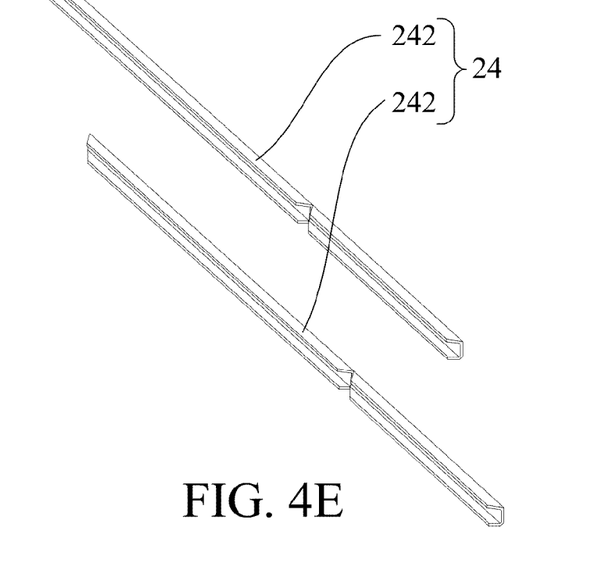

When N is equal to 2, namely, the two edge-engaging members 242 are formed of two molded metal thin strips. As another embodiment shown in FIG. 4D, one of the two edge-engaging members 242 corresponds to three of the four first edge portions 202, while the other edge-engaging member 242 corresponds to one of the four first edge portions 202. As another embodiment shown in FIG. 4E, one of the two edge-engaging members 242 corresponds to two of the four first edge portions 202, while the other edge-engaging member 242 corresponds to the other two of the four first edge portions 202.

Figure 4F:
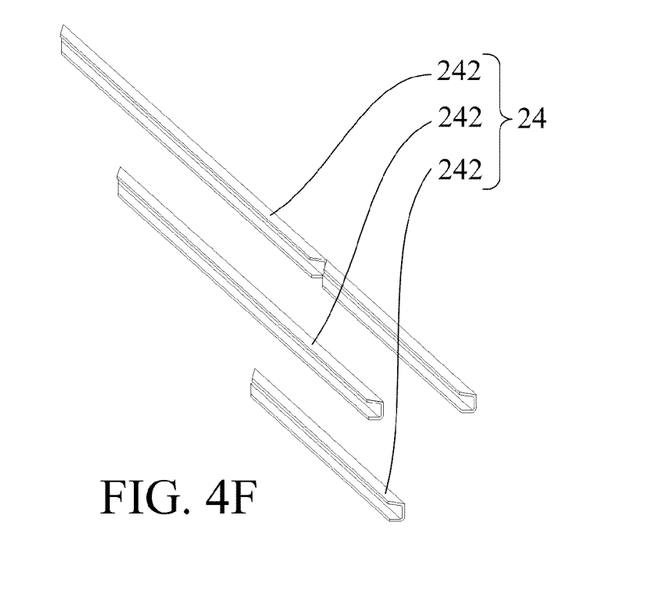

When N is equal to 3, namely, the three edge-engaging members 242 are formed of three molded metal thin strips. As another embodiment shown in FIG. 4F, one of the three edge-engaging members 242 corresponds to two of the four first edge portions 202, another edge-engaging member 242 corresponds to one of the four first edge portions 202, and the other edge-engaging member 242 corresponds to one of the four first edge portions 202.

Figure 4G:
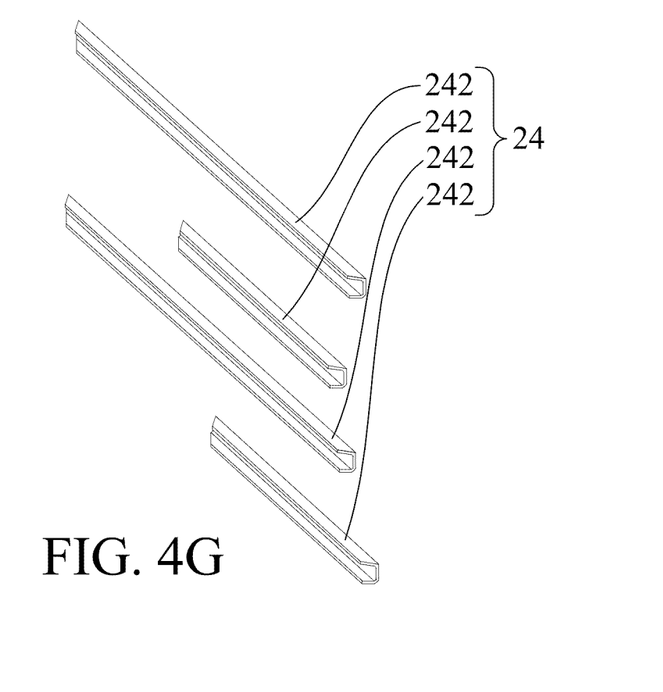

When N is equal to 4, namely, the four edge-engaging members 242 are formed of four molded metal thin strips. As another embodiment shown in FIG. 4G, each of the four edge-engaging members 242 corresponds to one of the four first edge portions 202.

Figure 5A:
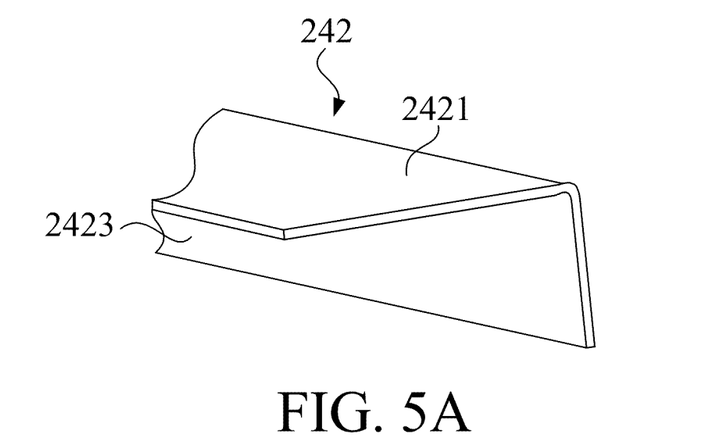
FIG. 5A is a partial view and its cross-section illustrating an edge-engaging member 242 according to an embodiment of the invention.
Figure 5B:
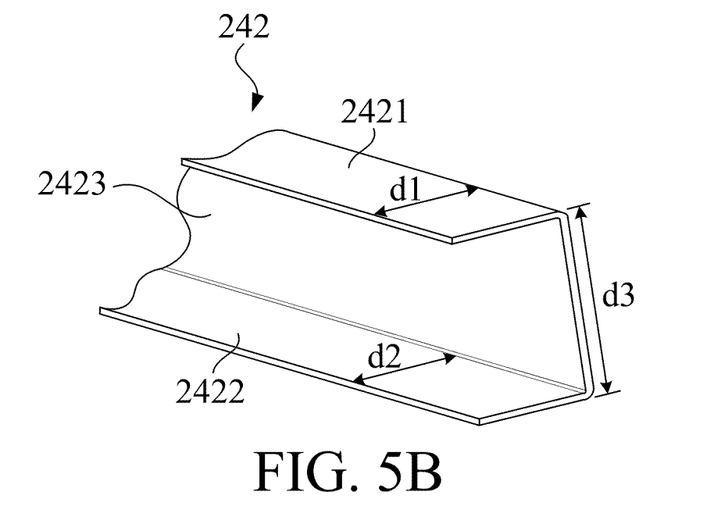
FIG. 5B is a partial view and its cross-section illustrating the edge-engaging member 242 according to another embodiment of the invention.
Figure 5C:
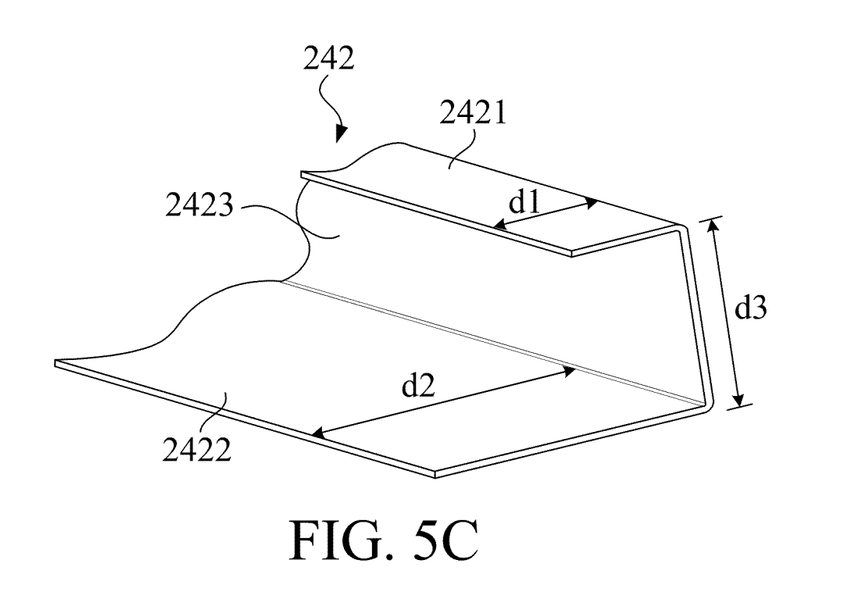
FIG. 5C is a partial view and its cross-section illustrating the edge-engaging member 242 according to another embodiment of the invention.

Please refer to FIG. 5A, FIG. 5B and FIG. 5C. FIG. 5A is a partial view and its cross-section illustrating an edge-engaging member 242 according to an embodiment of the invention. The cross-section of the edge-engaging member 242 illustrated in FIG. 5A has an L shape. FIG. 5B is a partial view and its cross-section illustrating an edge-engaging member 242 according to another embodiment of the invention. The cross-section of the edge-engaging member 242 illustrated in FIG. 5B has a U shape. FIG. 5C is a partial view and its cross-section illustrating the edge-engaging member 242 according to another embodiment of the invention. The cross-section of the edge-engaging member 242 illustrated in FIG. 5C has a J shape. Particularly, each of the N edge-engaging members 242 has a respective inner wall, as shown in FIG. 5A, FIG. 5B and FIG. 5C. The inner wall of each of the edge-engaging members 242 is adapted to receive and engage the at least one corresponding first edge portion 202 and the second edge portion 222 corresponding to said at least one first edge portion 202, whereby the LCD panel assembly 22 and the backlight assembly 20 are assembled, as shown in FIG. 4B.

Please refer to FIG. 5B and FIG. 5C. The inner wall of each of the edge-engaging members 242 comprises an upper wall 2421, a lower wall 2422 and a side wall 2423. The width d3 of the side wall 2423 is substantially equal to the summary of the thickness of the backlight assembly 20 and the thickness of the LCD panel assembly 22 under the design consideration.

Making use of the edge-engaging assembly 24 according to the invention, the back cover of the prior art can be removed depending on the demand of the whole strength of the LCD apparatus 2. As shown in FIG. 5B, the width d1 of the upper wall 2421 is substantially equal to the width d2 of the lower wall 2422, whose strength is lower in design, but its consumables is also less (its stiffness is already higher than the one of the bezel of the prior art and will be described in detail in the following specification). As shown in FIG. 5C, the width d1 of the upper wall 2421 is obviously smaller than the width d2 of the lower wall 2422, whose consumables is more, but its strength is higher and the back cover of the prior art can be removed.

Figure 6A:
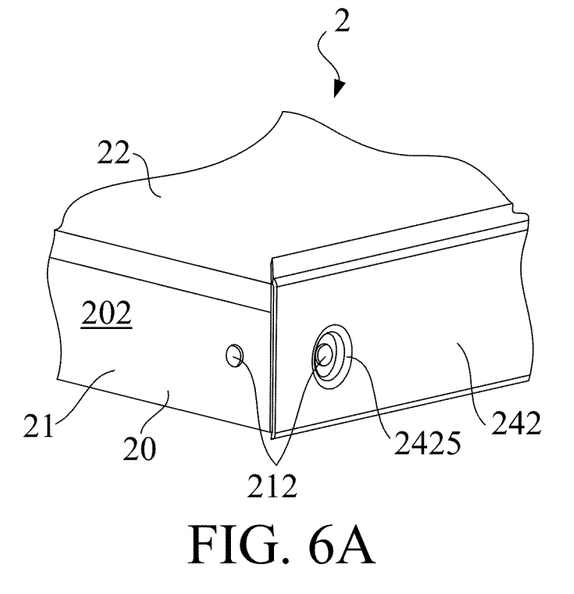
FIG. 6A is an engagement structure design illustrating engaged holes 2425 and engaging protrusions 212.

Similar to the prior art, the LCD apparatus 2 according to the invention has the design of an engagement structure so as to engage the backlight assembly 20 and the LCD panel assembly 22. The design of the engagement structure according to said embodiment is illustrated in FIG. 6A. As shown in FIG. 6A, the backlight assembly 20 comprises a housing 21. The housing 21 wraps the whole edge of the backlight assembly 20, i.e. the housing 21 provides the four first edge portions 202. The adapted edge-engaging member 242 has a plurality of penetrated engaged holes 2425. A plurality of engaging protrusions 212 extend from the housing 21. Each of the plurality of engaging protrusions 212 corresponds to one of the plurality of engaged holes 2425, and engages with its corresponded engaged hole 2425 in the assembly process of the LCD panel assembly 22 and the backlight assembly 20.

Figure 6B:
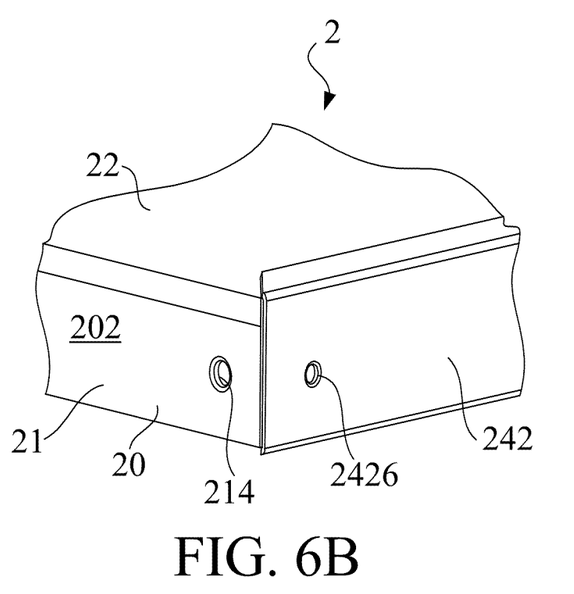
FIG. 6B is an engagement structure design illustrating engaged holes 214 and engaging protrusions 2426.

The design of the engagement structure different with FIG. 6A is shown in FIG. 6B. The adapted edge-engaging member 242 has a plurality of engaging protrusions 2426. A plurality of engaged holes 214 are formed on the housing 21. Each of the plurality of engaging protrusions 2426 corresponds to one of the plurality of engaged holes 214, and engages with its corresponded engaged hole 214 in the assembly process of the LCD panel assembly 22 and the backlight assembly 20.

Figure 6C:
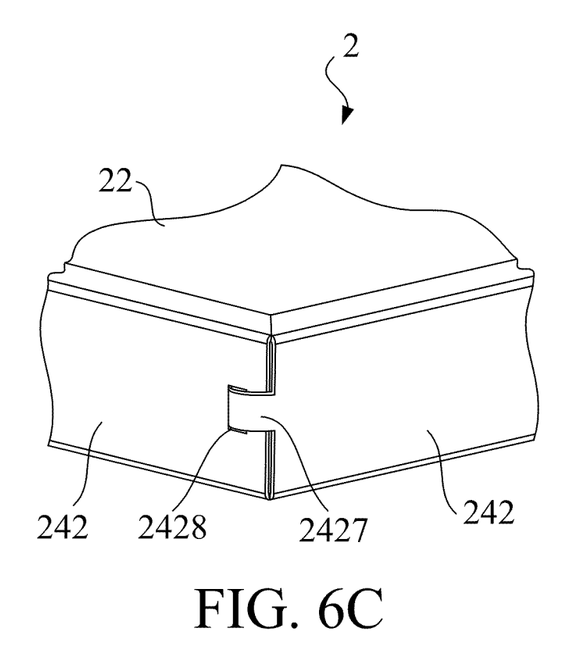
FIG. 6C is an engagement structure design illustrating an engaging protrusion 2427 and an engaged hole 2428.

Additionally, the design of the engagement structure of the LCD apparatus 2 can be like the one shown in FIG. 6C. As shown in FIG. 6C, the edge-engaging member 242 has a first end portion and a second end portion. An engaging protrusion 2427 is provided on the first end portion. An engaged hole 2428 is provided on the second end portion. The engaging protrusion 2427 engages with the engaged hole 2428 in the assembly process of the LCD panel assembly 22 and the backlight assembly 20.

Besides, an end portion of one of the end-engaging members 242 can also be riveted or welded to the end portion of adjacent edge-engaging member.

Figure 7A:
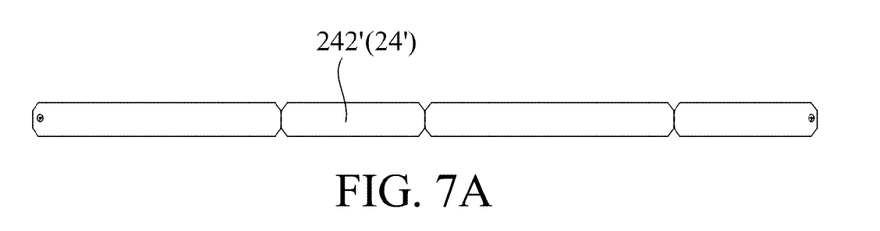
FIG. 7A to FIG. 7B illustrate the fabricating method according to another preferred embodiment of the invention.
Figure 7B:
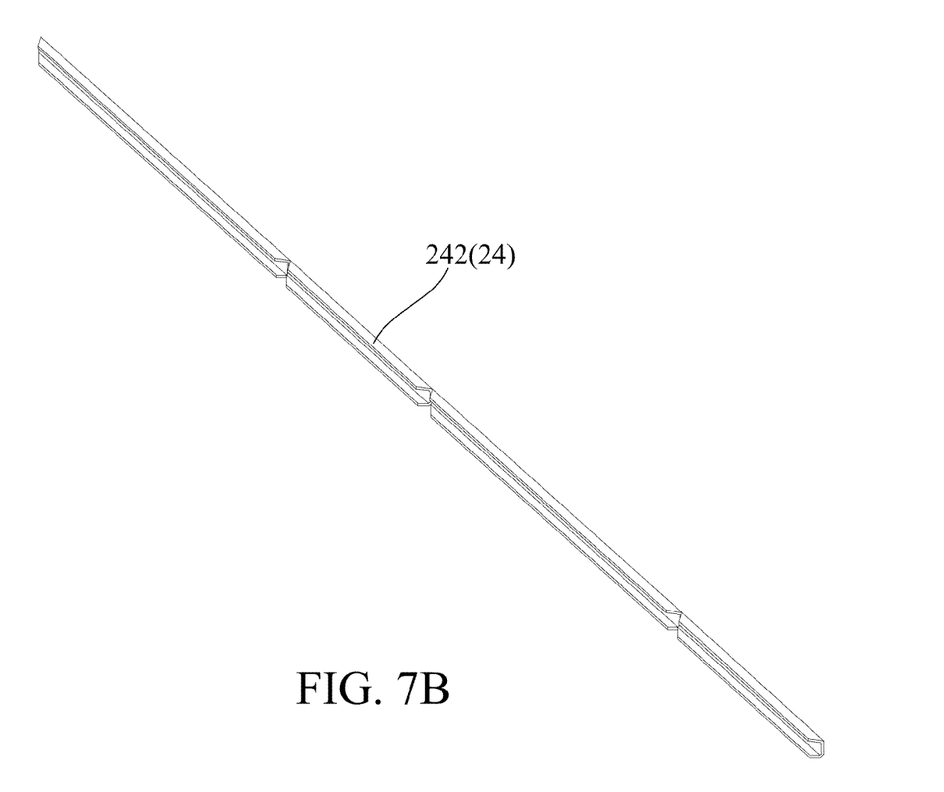

Please refer to FIG. 7A to FIG. 7B which illustrate the fabricating method according to another preferred embodiment of the invention. The fabricating method is used to fabricate the edge-engaging assembly 24 disclosed in said preferred embodiments.

As shown in FIG. 7A, the first step of the fabricating method is to prepare N molded thin strips 242', wherein N is an integer ranging from 1 to 4. An example of N equals to 4 is shown in FIG. 7A, which is capable of fabricating the edge-engaging assembly 24 shown in FIG. 3A.

Next, the N molded thin strips 242' are punched to form the N edge-engaging members 242, namely, the edge-engaging assembly 24 is finished.

The edge-engaging assembly 24 fabricated according to said fabricating method whose designs such as number of N, corresponding and engaging relationship with the edge portion of the backlight assembly and the edge portion of the LCD panel assembly, and its engagement structure are all the same as disclosed in said embodiments, and will not be further described here.

Figure 8:
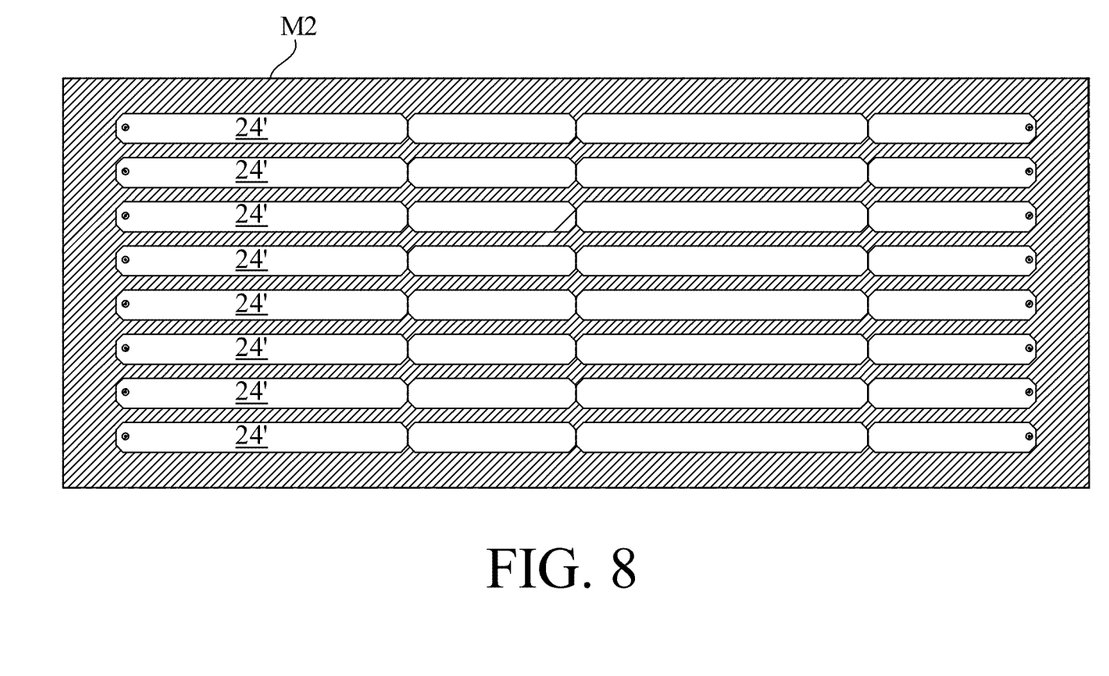
FIG. 8 is a schematic diagram illustrating several semi-finished bezels 24' modeled on a metal sheet M2 by one punching molding.

As shown in FIG. 8, said step of preparing N molded thin strips 242' can be performed by punching a metal sheet M2. FIG. 8 is a schematic diagram illustrating several semi-finished frames 24' modeled on the metal sheet M2 by one punching molding. The oblique-line area marked on the metal sheet M2 is the consumables. Obviously, the fabricating method of the edge-engaging assembly 24 according to the invention improves the fabricating efficiency and consumables reduction compared to the prior art.

Figure 9A:
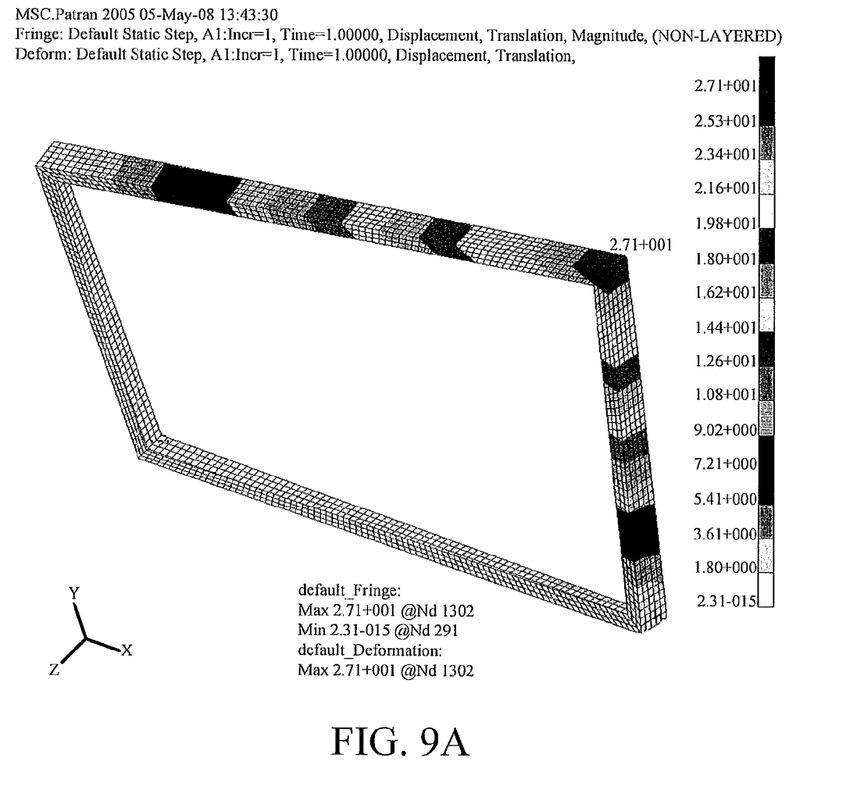
FIG. 9A is the bezel of the prior art shown in FIG. 2 which carries on simulation analysis for finite element.
Figure 9B:
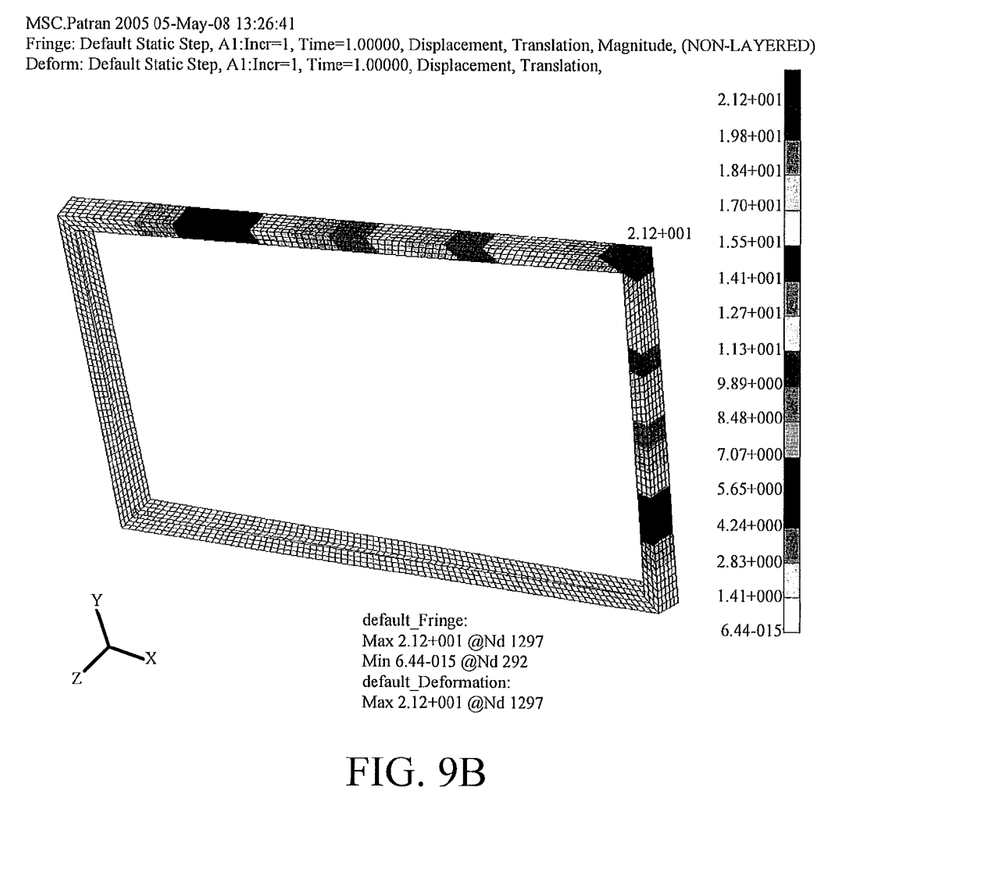
FIG. 9B is the edge-engaging member according to the invention shown in FIG. 5A which carries on simulation analysis for finite element.

The comparison between the stiffness of the edge-engaging assembly according to the invention and the stiffness of the bezel in the prior art are shown in FIG. 9A and FIG. 9B. FIG. 9A is the bezel of the prior art shown in FIG. 2, which carries on simulation analysis for finite element and generates the simulation data of deformation after suffering an external force. The conditions substituted into the simulation analysis of FIG. 9A are the geometric condition of the bezel: 165 mm (length)×100 mm (width)×6 mm (depth), the material: an aluminum/zinc-plating steel plate (the plate thickness is 0.4 mm), and the boundary condition: the direction 6 of the bezel's lower left-hand corner is restricted completely, and the bezel's top right-hand corner is exerted a load of 0.5N. FIG. 9B is the edge-engaging member according to the invention shown in FIG. 5A, which carries on simulation analysis for finite element and generates the simulation data of deformation after suffering an external force. The conditions substituted into the simulation analysis of FIG. 9B are all the same as the ones of FIG. 9A, and only the cross-section is different.

The simulation analysis result of FIG. 9A shows that its maximal deformation is 2.71 cm, while the one of FIG. 9B is 2.12 cm. Obviously, the stiffness of the edge-engaging structure (the edge-engaging assembly) according to the invention is higher the one of the bezel in the prior art.

By the above detailed description of embodiments according to this invention, it can be understood clearly that with the using of the edge-engaging assembly, according to this invention, its stiffness increases significantly, its fabricating efficiency is higher, and its consumables reduce largely. Accordingly, the edge-engaging assembly according to the invention is better than the design of the engagement member in the prior art for engaging and fixing the backlight assembly and the LCD panel assembly.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A liquid crystal display (LCD) apparatus, comprising:
   a backlight assembly with four first edge portions and with no back cover;
   an LCD panel assembly with four second edge portions and with no back cover, each of which corresponds to one of the first edge portions, and being disposed on the backlight assembly such that each of the second edge portions of the LCD panel assembly is substantially aligned with the corresponding first edge portion of the backlight assembly, wherein each of the second edge portions is longitudinally aligned with the corresponding first edge portion; and
   an edge-engaging assembly comprising N edge-engaging members, each of which corresponds to at least one of the first edge portions, N being an integer ranging from 1 to 4, each of the N edge-engaging members having a respective groove adapted to receive, contact and engage the at least one corresponding first edge portion and the second edge portions corresponding to said at least one first edge portion together such that no bezel is required, whereby the LCD panel assembly and the backlight assembly are assembled only by the edge-engaging assembly, wherein the cross-section of each of the N edge-engaging members comes in U shape, or J shape, wherein a width of an upper wall of the N edge-engaging members is smaller than a width of a lower wall of the N edge-engaging members, wherein the N edge-engaging members are formed of N molded metal thin strips and the backlight assembly comprises a housing which provides the four first edge portions, and the structure of the first edge portions being adapted to engage with the edge-engaging members, wherein an end portion of one of the edge-engaging members is adapted to engage with the end portion of adjacent edge-engaging member.

2. The LCD apparatus of claim 1, wherein an end portion of one of the edge-engaging members and the end portion of adjacent edge-engaging member are riveted or welded together.

3. A method of fabricating an edge-engaging assembly comprising N edge-engaging members for a liquid crystal display (LCD) apparatus comprising a backlight assembly with no back cover and an LCD panel assembly with no back cover, N being an integer ranging from 1 to 4, the backlight assembly having four first edge portions, the LCD panel assembly having four second edge portions, each of which corresponds to one of the first edge portions, said method comprising the steps of:

preparing N molded thin strips; and punching the N molded thin strips to form the N edge-engaging members, each of the N edge-engaging members corresponding to at least one of the first edge portions;

wherein during assembly of the LCD panel assembly and the backlight assembly, the LCD panel assembly is disposed on the backlight assembly such that each of the second edge portions of the LCD panel assembly is substantially aligned with the corresponding first edge portion of the backlight assembly, each of the second edge portions is longitudinally aligned with the corresponding first edge portion, and each of the N edge-engaging members engages the at least one corresponding first edge portion and the second edge portions corresponding to said at least one first edge portion together, wherein the N edge-engaging members has a respective groove adapted to receive, contact and engage the at least one corresponding first edge portion and the second edge portions corresponding to said at least one first edge portion together such that no bezel is required, whereby the LCD panel assembly and the backlight assembly are assembled only by the edge-engaging assembly, and the cross-section of each of the N edge-engaging members comes in U shape, or J shape, wherein a width of an upper wall of the N edge-engaging members is smaller than a width of a lower wall of the N edge-engaging members, wherein the step of preparing the N molded thin strips is performed by punching a metal sheet and the backlight assembly comprises a housing which provides the four first edge portions, and the structure of the first edge portions being adapted to engage with the edge-engaging members, wherein an end portion of one of the edge-engaging members is adapted to engage with an end portion of another of the edge-engaging members.

4. The method of claim 3, wherein an end portion of one of the edge-engaging members and the end portion of adjacent edge-engaging member are riveted or welded together.

\* \* \* \* \*